(12) United States Patent
Kaul

(10) Patent No.: US 7,172,427 B2
(45) Date of Patent: Feb. 6, 2007

(54) SYSTEM AND PROCESS FOR TEACHING SPEECH TO PEOPLE WITH HEARING OR SPEECH DISABILITIES

(76) Inventor: Sandra D Kaul, 420 Camino Cielo, Rescue, CA (US) 95672

( * ) Notice: Subject to any disclaimer, the term of this patent is extended or adjusted under 35 U.S.C. 154(b) by 211 days.

(21) Appl. No.: 10/914,193

(22) Filed: Aug. 10, 2004

(65) Prior Publication Data

US 2005/0037322 A1   Feb. 17, 2005

Related U.S. Application Data

(60) Provisional application No. 60/494,419, filed on Aug. 11, 2003.

(51) Int. Cl.
    *G09B 17/00* (2006.01)
(52) U.S. Cl. ...................................... 434/178
(58) Field of Classification Search ................ 434/156, 434/167, 170, 178, 185
    See application file for complete search history.

(56) References Cited

U.S. PATENT DOCUMENTS

| | | | |
|---|---|---|---|
| 1,428,456 A | | 9/1922 | Stranders |
| 3,426,451 A | * | 2/1969 | Hoffmann .................. 434/178 |
| 3,654,712 A | * | 4/1972 | Bagdasar ................... 434/170 |
| 3,715,812 A | * | 2/1973 | Novak ....................... 434/170 |
| 4,007,548 A | * | 2/1977 | Cytanovich ................ 434/178 |
| 4,115,932 A | | 9/1978 | Charlesworth |
| 4,193,212 A | * | 3/1980 | Al-Kufaishi ............... 434/178 |
| 4,443,199 A | * | 4/1984 | Sakai ......................... 434/170 |
| 4,609,357 A | * | 9/1986 | Clegg ........................ 434/167 |
| 4,643,680 A | * | 2/1987 | Hill ............................ 434/170 |
| 4,655,713 A | * | 4/1987 | Weiss ......................... 434/178 |
| 5,429,513 A | * | 7/1995 | Diaz-Plaza ................. 434/167 |
| 6,126,447 A | * | 10/2000 | Engelbrite ................. 434/167 |
| 6,604,947 B1 | * | 8/2003 | Rai ............................ 434/170 |
| 7,011,525 B2 | * | 3/2006 | Mejia ........................ 434/167 |
| 2002/0119429 A1 | | 8/2002 | Barton |
| 2002/0142270 A1 | | 10/2002 | Furry |

OTHER PUBLICATIONS

I. Pitman, H. Ellis; "International Phonetic Alphabet;" The International Phonetic Association; 1847, revised 1993, updated 1996.
S.D. Kaul; "Visual Phonemes for Teaching Speech to People with Hearing or Speech Disabilities;" from Fonemz™ Teaching Materials; Jul. 2004; pp. 1-8; Sandy Kaul, Rescue, CA USA.

* cited by examiner

*Primary Examiner*—Kurt Fernstrom
(74) *Attorney, Agent, or Firm*—Donald Grant Kelly

(57) ABSTRACT

System and process for teaching speech utilizing visual phonemes as physical, representations or surrogates of spoken sounds. Such demonstration teaching tools or implements may be tangible or viewed on a computer, and are provided. These are distinguished by recognizable shapes and colors. They are modeled upon a number of sources including: characters of the International Phonetic Alphabet; shapes of a speaker's mouth configurations; certain English alphabet letters associated with spoken sounds. Visual phonemes representing spoken vowel sounds have warm colors; those representing consonants, cool colors. Combinations of vowel sounds, diphthongs, are represented by visual phonemes displaying blends of warm colors representing each spoken vowel sound in the diphthong combination. The implements may be rigid or flexible, or displayed in electronic form. They may be fabricated to facilitate mounting on a display surface. The disclosed system and process may be advantageously presented in the form of a portable kit.

14 Claims, 9 Drawing Sheets

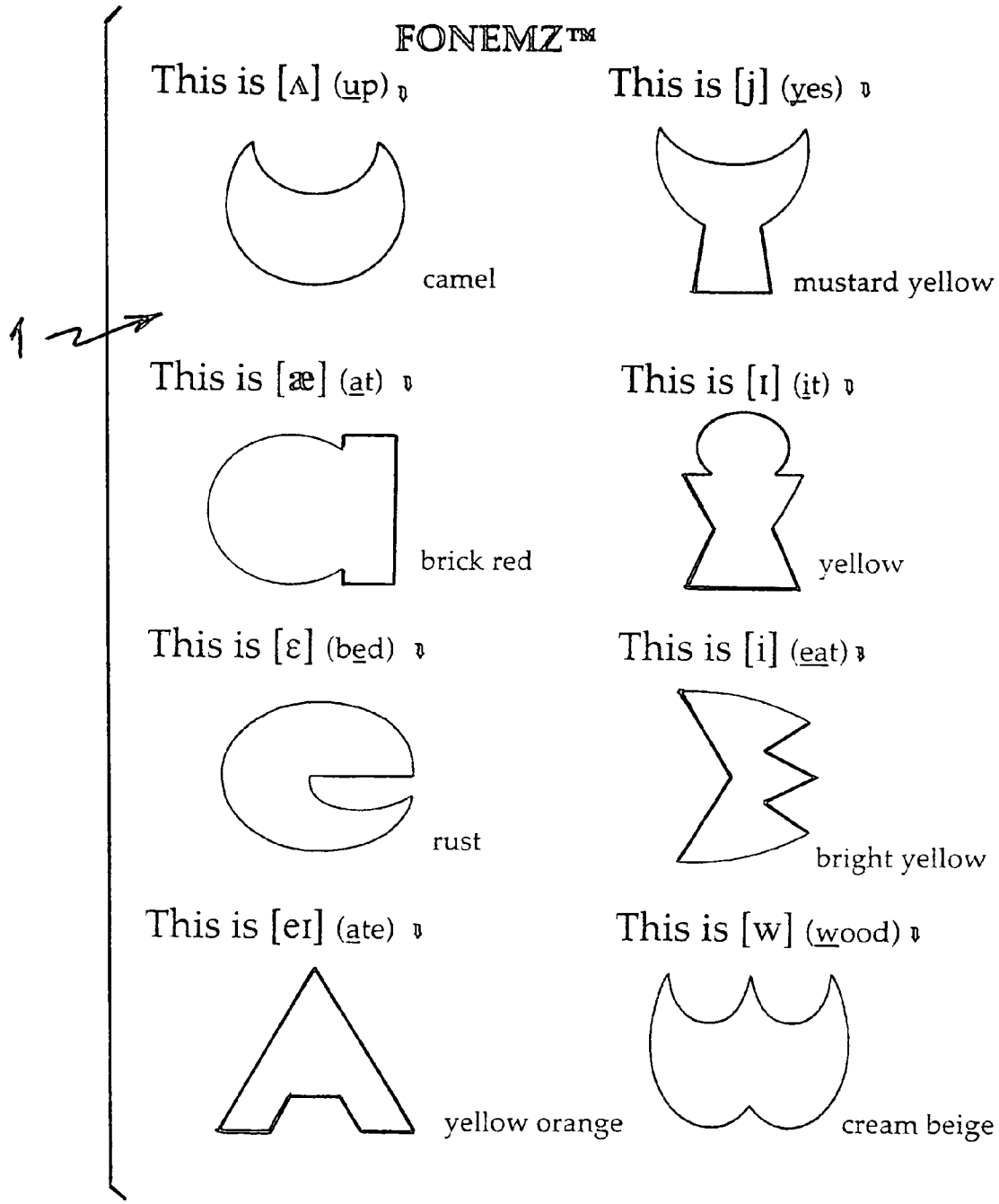
Fig. 1-a

FONEMZ™ Vowels
This is [ɑ] (h<u>o</u>t) 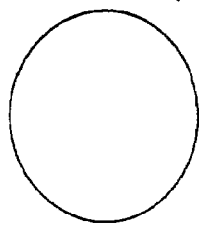
red
This is [ou] (b<u>oa</u>t) 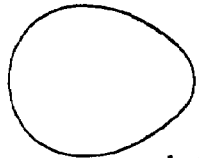
bright pink
This is [ɔ] (d<u>o</u>g) 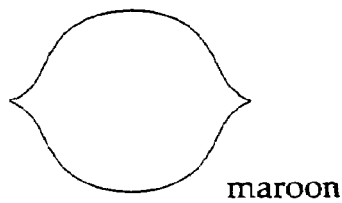
maroon
This is [ɔɪ] (b<u>oy</u>) 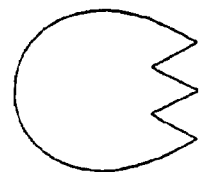
salmon
This is [ɑɪ] (b<u>i</u>ke) 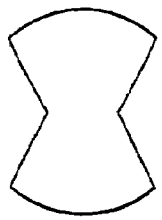
orange
This is [ʊ] (c<u>oo</u>k) 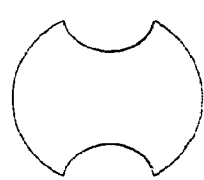
pink
This is [ɑu] (<u>ou</u>t) 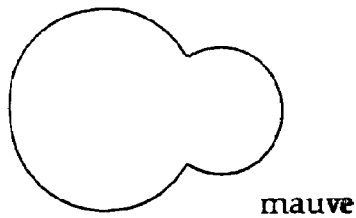
mauve
This is [u] (f<u>oo</u>d) 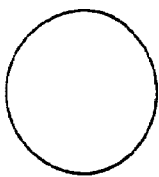
off white
*Fig. 1~b*

FONEMZ™ Consonants
This is [p] ↓
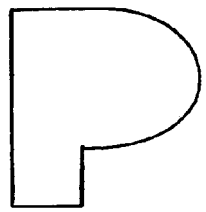
lime green
This is [b] ↓
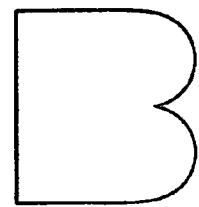
green
This is [m] ↴ — 4
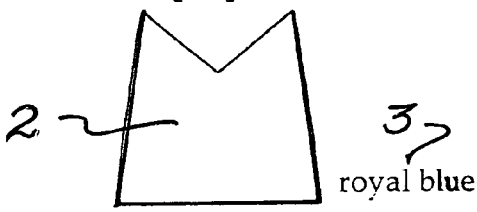
royal blue
This is [h] ↓
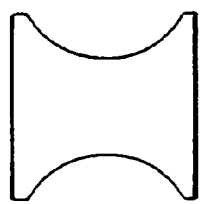
white
This is [f] ↓
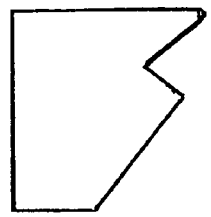
lavender
This is [v] ↓
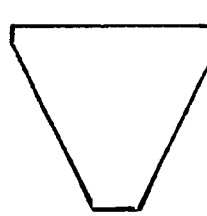
purple
This is [k] ↓
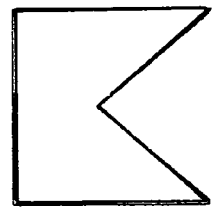
olive yellow
This is [g] ↓
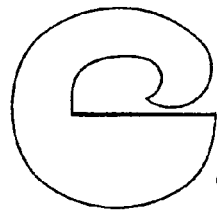
olive green
*Fig. 1-c*

FONEMZ™ Consonants
This is [l] ↓
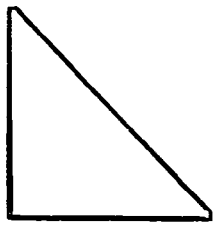
mocha brown
This is [n] ↓
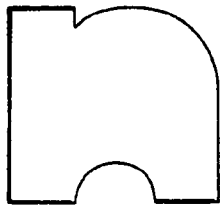
olive brown
This is [ŋ] (si<u>ng</u>) ↓
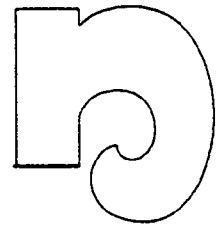
gray olive
This is [θ] (<u>th</u>in) ↓
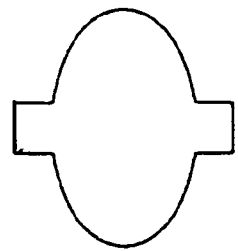
light gray
This is [ð] (<u>th</u>at) ↓
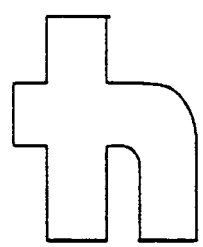
gray
This is [t] ↓
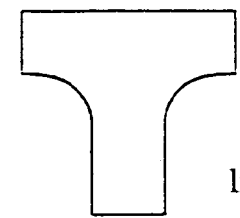
light turquoise
This is [d] ↓
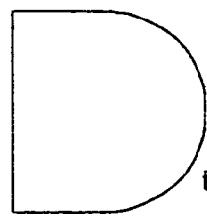
turquoise
*Fig. 1-d*

FONEMZ™ Consonants
This is [s] ♪
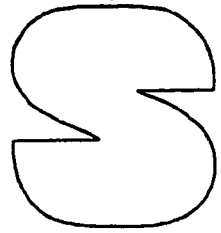
light blue
This is [z] ♪
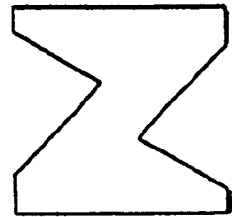
blue
This is [ʃ] (she) ♪
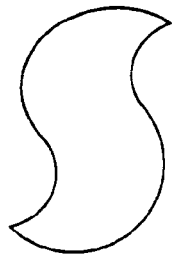
gray blue
This is [ʒ] (rouge) ♪
wedgewood blue
This is [tʃ] (chick) ♪
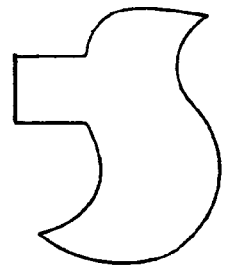
jade
This is [dʒ] (jump) ♪
forest green
This is [r] (ring) ♪
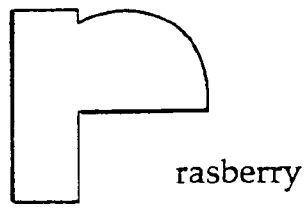
rasberry
This is [ɝ] (bird) ♪
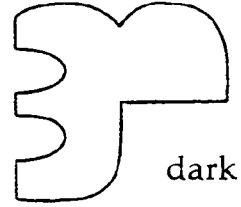
dark chocolate
*Fig. 1-e*

CONSONANTS (PULMONIC)

THE INTERNATIONAL PHONETIC ALPHABET (revised to 1993)

| | Bilabial | Labiodental | Dental | Alveolar | Postalveolar | Retroflex | Palatal | Velar | Uvular | Pharyngeal | Glottal |
|---|---|---|---|---|---|---|---|---|---|---|---|
| Plosive | p b | | | t d | | ʈ ɖ | c ɟ | k g | q ɢ | | ʔ |
| Nasal | m | ɱ | | n | | ɳ | ɲ | ŋ | ɴ | | |
| Trill | ʙ | | | r | | | | | ʀ | | |
| Tap or Flap | | | | ɾ | | ɽ | | | | | |
| Fricative | ɸ β | f v | θ ð | s z | ʃ ʒ | ʂ ʐ | ç ʝ | x ɣ | χ ʁ | ħ ʕ | h ɦ |
| Lateral fricative | | | | ɬ ɮ | | | | | | | |
| Approximant | | ʋ | | ɹ | | ɻ | j | ɰ | | | |
| Lateral approximant | | | | l | | ɭ | ʎ | ʟ | | | |

Where symbols appear in pairs, the one to the right represents a voiced consonant. Shaded areas denote articulations judged impossible.

Fig. 9 — Prior Art

SYSTEM AND PROCESS FOR TEACHING SPEECH TO PEOPLE WITH HEARING OR SPEECH DISABILITIES

REFERENCE TO RELATED APPLICATIONS

The present application claims priority under 35 USC 119(e), of applicant's Provisional Patent Application Ser. No. 60/494,419 filed Aug. 11, 2003 herein incorporated in its entirety. The present invention is the subject matter of applicant's Disclosure Document filed in the U.S. Patent and Trademark Office on Apr. 28, 2003 and designated Document Disclosure Program Registration Number 530,547; all benefits thereof are claimed under 35 U.S.C. section 122; 37 C.F.R. section 1.14, and MPEP section 1706.

STATEMENT REGARDING FEDERALLY SPONSORED RESEARCH OR DEVELOPMENT

Not applicable

REFERENCE TO SEQUENCE LISTING

Not applicable

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of education, in general. More specifically, it relates to a system for, and process of, teaching individuals with hearing disabilities to talk or to express themselves orally with improved intelligibility.

While holding potential for direct application to any individuals who themselves are, or have become, hearing challenged and fully or partially incapable of oral communication, the present inventive system and process have been developed for application particularly to children with hearing impairments or other disabilities adversely impacting capability of oral expression. The inventive system and process presented herein, however, is by no means to be considered as limited in scope as to applying only to children.

Across the spectrum of education, for all age levels and types of student subjects, no greater professional challenge exists than that facing a speech pathologist or teacher striving to help a non-hearing child to learn to speak. Of course, for the hearing-impaired child, learning to speak certainly is no less a challenge. A great number of such children face this challenge at birth or soon thereafter. From that moment on, their challenge seems insurmountable. After all, how can profoundly deaf children understand anything of speech when they cannot perceive words or phrases even when shouted?

Children with hearing impairments are by no means a rare phenomenon. According to the Deafness Research Foundation (2003 *State Report Card, Listen up!*), "More than 12,000 infants in the United States—one in 300—are born each year with a hearing impairment. Of these, 4000 are profoundly deaf. In fact, hearing loss is the number one birth defect in the United States." Besides, still others in great numbers will face post-birth hearing loss for a variety of reasons.

While deaf children might readily observe the lip movements of those speaking directly to them, they obviously associate no sound with such movements. Lip movements, to them, are thus meaninglessly silent. Beyond that, the input gained by a "hearing child" listening to sounds from an observed speaker is lost on the profoundly deaf. Depending on the level of hearing, the auditory input may be inadequate or non existent, to be able to make any oral/speech sound associations.

The challenged child will focus instead upon more obvious and imposing movements like gestures or actions. Disadvantaged by an absence or limited reception of auditory models for sounds, the deaf child will either not speak at all or develop a manner of speech that is unintelligible to an unsophisticated public. The challenged child will focus instead upon more obvious and imposing movements like gestures, actions and the surrounding colorful world. Even many hearing children do not cognitively register that the sounds they make are different than the sounds people are saying.

Over the years, innovative therapists, linguists, technologists, teachers and pathologists, and hybrids of two or more of such professions have created helpful tools and processes to address this daunting challenge. They have done so with only limited degrees of success. Still, as will be discussed below, ample room exists for improvement in the educational process. There is a substantial need on the part of educators throughout the world for simpler yet more effective tools.

Teaching strategies, developed and applied with limited or mixed success, have involved phonology, phonetics, and to a limited extent have leveraged the concepts of phonemes. "Phonemes," in this context, are the individual sounds emitted by speaking. Phonemes are traditionally represented in a phonetic script, wherein each descriptor represents a single phoneme.

For years, linguists and/or speech experts have classified speech sounds into representational categories called phonemes. The American English language finds itself represented by more than four dozen phonemes, although the exact count varies due to vast numbers of dialects indigenous to geographic regions. Phoneme descriptors range, for example, from monophthongs and diphthongs covering more than a dozen vowel forms, to consonant depictions categorized as approximants, nasals, fricatives, plosives, and affricates. No two categorized spoken sounds are the same. Ironically, these esoteric descriptors just mentioned seem to a layperson as a language from a distant world, yet they are in fact subset groupings of all spoken language sounds.

An *International Phonetic Alphabet*, or IPA, was developed and first published in 1888 by the International Phonetic Association, an organization founded by Paul Passy. The IPA was modeled on the 1847 works of Isaac Pitman and Henry Ellis, and eventually was revised in 1993, and again in 1996. The IPA is used by speech pathologists and others to transcribe the spoken word in dictionaries to describe the pronunciation of words, and to depict unwritten languages.

The most current chart showing the standard phonemes of the IPA is referenced as prior art within this application, to be further discussed below, and may be accessed and reviewed in more detail at an Internet website http://www.arts.gla.ac.uk/IPA/pulmonic.html (See: *Reproduction of the International Phonetic Alphabet*, revised to 1993, updated to 1996; Department of Linguistics, University of Victoria, Canada.)

While unknown, or at best little appreciated, by a typical layperson, oral communication fairly flows on the science of the production of phonemes. In brief, it consists of the placement of tongue and teeth within a mouth with specific posture and combines with breath and voicing, which may resonate in the nose or mouth. By stringing these movements and sounds together, they collaborate to form and project the words common to a person's lexicon. In typical oral communications, the listening recipient takes in the uttered phonemes and tones. The recipient hears, interprets, learns, reacts and responds in kind. But, meaningful comprehension and exchange are in no way easy for the hearing or speech impaired, especially if such impairment significant or profound.

A small child with a severe to profound hearing loss may be so close as to sense a speakers fricative or plosive puff of breath, or even so near as to touch her moving lips; yet wholly incapable of associating those complex mouth movements with manner of the production of the phonemes. Figuratively, this small child remains miles away, wandering in a world of silence where interpretive connectivity cannot exist. Under such circumstances, the non-hearing child simply cannot communicatively react by expressing a cogent oral response.

One known strategy for teaching a hearing impaired child to talk is to utilize a teaching aid in the form of a graphic representation or image of a certain sound associated with speaking. The representation usually is presented in isolation. Most typically, speech pathologists or teachers employ letters of the Roman alphabet in association with the sounds being produced or intended. There are problems with trying to represent a sound to a young child in this way. These are discussed as follows.

First, the young child is usually beginning to associate the Roman alphabet name with the letter symbol or physical form presented to him or her. There are 26 letters of the alphabet and some have different sounds associated with them. Thus, any attempt to instruct the child by assigning still another symbol or name, as for example by a phoneme, is understandably confusing.

Second, the phoneme generally is presented as a black-on-white (or reverse) image, and as such is extremely difficult to commit to memory. Third, and adding still more complexity, the English language does not have a one-to-one association of phoneme to alphabet letter. As noted above, there are more than forty-six American English phonemes, while the alphabet is limited to twenty-six characters.

Colors have been employed in reading aids and phonetic systems as a way to enhance effectiveness of learning. As early as 1922, U.S. Pat. No. 1,428,456 to Stranders disclosed the use of colors associated with particular letters of the alphabet.

More recently, Engelbrite described a color-assonant phonetics system in U.S. Pat. No. 6,126,447 to facilitate reading and pronunciation. Engelbrite represents consonant phonemes as a group by depicting them as black letters; while vowel phonemes are depicted as a group by letters each colored in a shade that rhymes with the sound of the vowel.

Uncommon letters are demonstrated in Engelbrite's disclosure as slanted letters, while silent letters are displayed as thin fonts. Under the Engelbright system, three font styles are applied to the English alphabet, along with as many as fifteen colors. To a struggling child, particularly one already coping with severe hearing disability, such a complex system could pose an insurmountable challenge to effective learning.

Charlesworth's U.S. Pat. No. 4,115,932 presents another phonetics system where letters are displayed on tile elements, depicting vowels and various vowel combinations as are known in the science of language as diagraphs and diphthongs. The tiles are given various colors representative of specific vowels and combinations, some of which may be associated through rhyme.

For example, the diphthong "oo" is demonstrated by patentee Charlesworth on a tile given the color blue, where the word "blue" intentionally simulates or rhymes with the spoken sound "oo" common to this diphthong. Unfortunately, rhymes are meaningless to those who are hearing challenged. Diaz-Plaza, in U.S. Pat. No. 5,429,513, presents an interactive teaching apparatus and method involving a complex system of graphemes, grapheme names, phonemes and phonetics, where distinctive colors are associated with speech sounds, depicted by the Roman alphabet In some teaching systems and processes, combinations of diverse learning media are employed, and may be presented in the form of a learning kit. For example, Hooked on Phonics®, a Santa Ana, Calif. based company has, for more than a dozen years, employed a combination of media and tools to aid communications comprehension by young people. The elements employed as part of such a kit include flash cards, reward stickers, games, music and so forth. The scope of this process and system obviously is limited to helping reactive, "hearing" children learn to read Roman alphabet letters and written words.

In another product, known in the field as Lindamood Phonetics Sequencing or LiPS®, and developed by Lindamood-Bell Learning Processes (based in San Luis Obispo, Calif.), colored felt squares are utilized to determine sound placements within words. In the Lindamood-Bell product, however, no specific color is assigned to a specific phoneme. Besides, students to whom the LiPS® process applies are capable of hearing, but seemingly lack an ability to routinely connect what is heard (or read) with specific phonemes or phoneme sequences. Such children may be presumed to have Attention Deficit Disorder, Central Auditory Processing Disorder, Dyslexia, or some other communicative or processing disorder.

Still other existing products associate animals or objects with the Roman alphabet to represent a sound. A very young child confounded with lack of hearing will see these as daunting visual challenges further complicating her or his situation. Besides, such products and systems fail to recognize that words are rarely pronounced in the same way across different regions.

The published literature, as exemplified above, falls short in terms of providing a useful system or process for teaching speech to people with hearing or speech disabilities. This is particularly true in teaching children and others with severe to profound hearing loss. Granted, a great number of inventions and innovations have been developed and documented to help such children: to learn the alphabet; to translate and thoughtfully process language; to improve their spelling and pronunciation abilities; and to facilitate comprehension of the written word. The problem is that presently known tools, products and systems lack an effective incorporation of phonetics (representing the phonemes of spoken language) in a workable teaching medium to address the critical needs of individuals with severe hearing impairment and young children with speech disorders.

With each passing day, more than a dozen children with profound hearing impairment are born in the United States. Still others are similarly disabled through diseases or accidents. Whether, and how well, they will learn or relearn the critical skills of oral communication depends upon tireless dedication of good teachers and a high quality set of innovative tools and processes. It is painfully evident that prior and/or existing attempts in this regard have served to increase their challenges rather than to facilitate their learning development.

A clear and urgent need exists for a relatively easy-to-use and simple-to-follow system and process to be employed in teaching hearing-impaired children (and other students as may be appropriate and necessary) to speak. This great need is satisfied by the invention to be fully and completely described below.

BRIEF SUMMARY OF THE INVENTION

The principal object of the invention described below is to provide a system and process for teaching speech to people of all ages with hearing or speech disabilities, and particularly to young children (all referred to below, for convenience of disclosure, as "students" and/or "people"). The inventive process and system are further disclosed as conveniently embodied in and/or facilitated by a kit or resource collection. This kit or collection is designed to contain a range of teaching implements or tools related to the present invention, and is readily opened and employed for instructional application of the process and system in a classroom, home, clinic or other setting "in the field" as convenient or otherwise appropriate.

The present inventive process and system draw from, model on, or build upon, a number of sources. In doing so, they present a unique collection of instructional visual phonemes which are visual representations or surrogates of spoken sounds. These visual phonemes can be readily seen, touched and/or even manipulated by a student. Further, such visual phonemes may take the form of an electronic image where characteristics are viewed as virtual. The inventive process and system further employ a range of unique colors and unique shapes to distinctly and individually depict or visually represent each vowel and consonant sound of the American English language. It should be noted that, with little modification, the present inventive system and process may readily apply to languages other than American English, and to do so is considered well within the scope and intent of the invention described and claimed herein.

As noted, an embodiment or configuration of the inventive system and process can be presented in electronic form, as by images displayed on a typical CRT, LCD screen or the like, and supplied from electronic storage on a computer hard drive, software, floppy disc, CD, DVD or the like. Similarly, the invention can be embodied in other video media, as for example videotape prepared for display on a TV monitor or the like.

In any case, the basic elements of the invention, namely visual phonemes, are specifically configured or shaped in a predetermined form, and provided with distinctive tactile and/or visual qualities, including but not limited to a choice of constructional materials, fabric and the like to be described below, as well as individualized coloring. The visual phonemes described as central to the present invention may be real or virtual (so long as the distinctive attributes can be depicted and demonstrated in a reasonable manner).

While all known spoken sounds are to be considered as encompassed within the scope of the present invention, the present description relates, by example only, to sixteen vowel sounds and twenty-three consonant sounds, essentially those sounds or phonemes most frequently encountered in American English language. Representational or surrogate visual phonemes of other spoken sounds, for example those common to unusual dialects and non-English languages can be included as desired, needed or subsequently developed, and still within the intended scope of applicant's claimed invention.

A further object of the present inventive process and system is to provide instructional media that includes instructive components that are portable, simple and non-confusing in their use, and where each subject visual phoneme may be presented in easily recognizable and recallable form.

A still further object is to present process steps and system of interactively representing specific "target" sounds through a distinctive set of phonemes embodied as visually recognizable elements of two or three dimension. Each instructional, visual phoneme within said set is creatively modeled after one or more forms or configurations selected from a group of shapes consisting of: (1) certain established characters of the International Phonetic Alphabet, or IPA; (2) simulations of human mouth (including lip) configurations associated with, or displayed during, a speaker's formulation of certain phonemes or sounds; (3) selected English alphabet letters commonly and directly associated with certain spoken sounds. Moreover, every instructional, visual phoneme is assigned a uniquely identifiable color or blend of colors.

Advantageously, under the present inventive process and system, it is an objective that only one name or identifier is associated or attached to a target sound being taught to a student, and the distinct colors are applied to further reinforce visual recall.

A still further object is to present a kit or collection including a unique set of visual phonemes creatively configured as aids or tools to represent target sounds most appropriate in the teaching of speech to students or other people with severe to profound hearing-impairment or other speech disabilities. Within such a kit, phonemes can be embodied in a number of structural forms, for example in two-dimensional representations (as by drawings, photographs, or other displayed images and forms) or three-dimensional configurations constructed of any of a variety of materials or compositions either substantially rigid or substantially soft and flexible.

Alternatively, as indicated hereabove, it is an object that visual phonemes presented virtually, e.g., displayed digitally in electronic form, may have a simulated texture, flexibility and three-dimensional qualities, and thereby present an interactive teaching effect reasonably consistent with a non-virtual experience.

Still another object of this invention is to deliver an effective, interactive learning experience afforded by the present invention process and system having special application to the teaching of speech to small children with severe to profound hearing-impairment or other speech disabilities, and obviously without current or prior capacity to associate sounds with speech. The invention also holds potential for application to older subjects, for example students with a history of difficulties with sound-speech association. Further, the inventive process and system hold promise for older subjects with certain disabling injuries or diseases resulting in hearing loss and concomitant speech difficulties.

Other objects, features, and characteristics of the present invention will become apparent upon consideration of the following full description, and with reference to the accompanying drawings, wherein like reference numerals designate corresponding elements in the various figures.

BRIEF DESCRIPTION OF THE SEVERAL VIEWS OF THE DRAWINGS

Referring now to the accompanying drawings, constituting a part hereof, and where like reference characters indicate like parts, it is seen that:

FIGS. 1a–e illustrate sound representations in the form of visual phonemes developed as part of the present invention, and further indicating corresponding characters of the *International Phonetic Alphabet* (These figures are noted as depicting material subject to Copyright);

Figure 8:
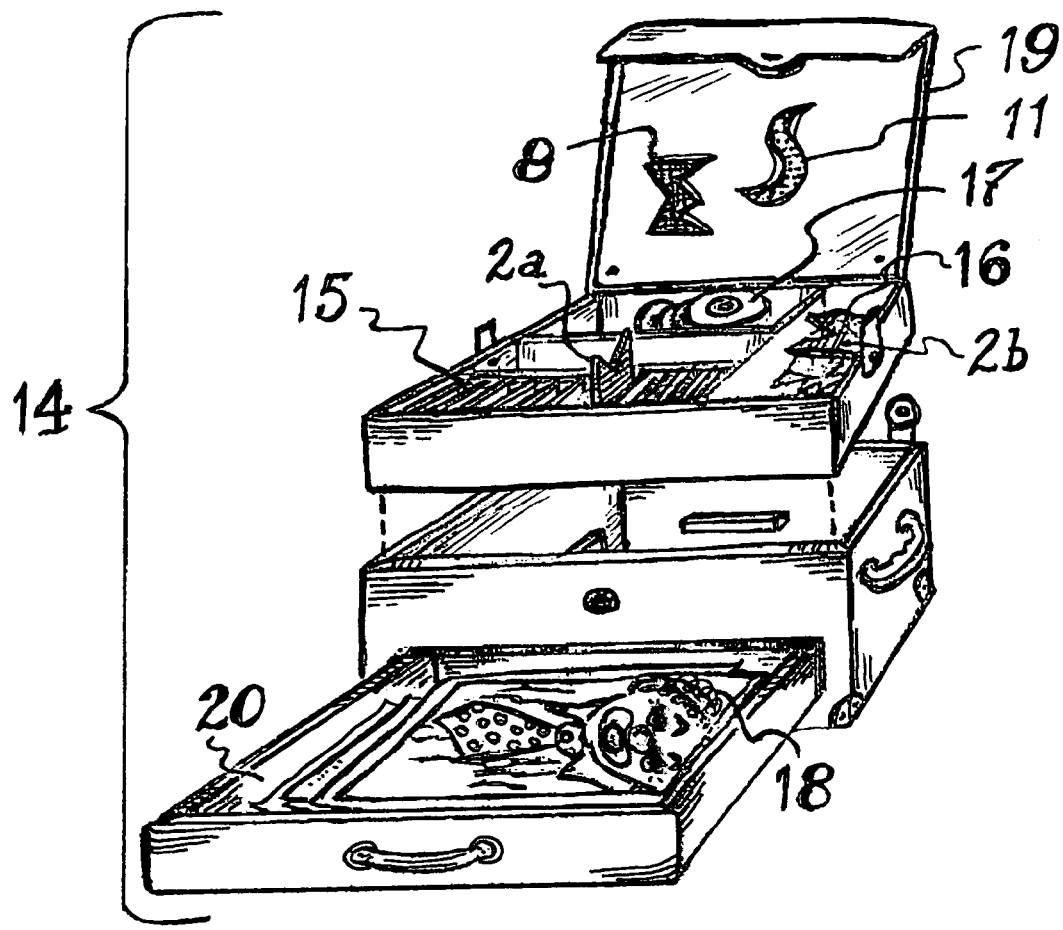

The front perspective view provided by FIG. 8 illustrates an example of a kit embodiment or containerized collection of visual phonemes and associated instructive tools, protocols, teaching aids, and materials in accordance with the present process and system (This figure is noted as including material subject to Copyright).

FIG. 9 depicts a portion of a published chart showing *The International Phonetic Alphabet* designated and referred to herein as Prior Art.

DETAILED DESCRIPTION OF THE INVENTION

This invention provides a two and three dimensional sound representational system, and the method or process for utilizing said system. The invention is for presenting the concept of speech sound production to people of any age having severe to profound hearing impairments or other disabilities limiting speech capabilities. The present system and process, described as the invention herein, can be utilized alone or in conjunction with known or conventional methods and tools for teaching individuals phonemic awareness and articulation of speech sounds.

The very young, hearing-challenged child is a principal target for this inventive process and system. As discussed above, children may be profoundly deaf from birth, and thus face the daunting challenge of learning to speak. Worse still, they must do this without auditory reception or recollection of sounds, familiar words or characters of alphabets, nor even the comforting sound of a parent's voice to emulate. Though particularly applicable to children, the inventive process and system also hold considerable promise for a wide range of hearing impaired individuals. Accordingly, the scope of the invention reflected in the appended claims is not to be interpreted as limited to any specific age range.

The representations of speech sounds (or target sounds) as contemplated by the present inventive system and process, are referred to generally as visual phonemes. Merely as a point of information, and without limiting invention scope, the representational visual phonemes as teaching tools associated with the present inventive process and system also carry commercial names or trademarks (as asserted and held by applicant), e.g., FONEMZ™.

The visual phonemes, subjects of the present inventive process and system, may be created in a number of ways, all to be considered well within the metes and bounds of the claimed inventive subject matter. They may possess a range of physical qualities in terms of colors, textures, and weight. They may be substantially rigid or substantially flexible; even soft and pliable, in whole or part. Ingredients and manufacturing techniques are chosen based on the nature and qualities desired of the visual phoneme. These may be natural or artificial, and will be valued for light weight portability, durability, low cost and disposable characteristics.

Where substantially flexible visual phonemes are desired, they are manufactured in a variety of ways, and constructed from substantially flexible material selected from the group consisting of felt, felt-like, foam, plastic, rubber, paper and cloth materials. The term "felt" refers to matted, compressed animal fibers such as wool or fur, sometimes mixed with vegetable or synthetic fibers, or to material resembling felt. The term "felt-like," for purposes of this application, refers to material that simulates felt in terms of tactile, weight and shape-holding qualities. "Felt-like" material may exist essentially as matted, compressed fibers that that are of the non-animal type and wholly vegetable or synthetic; it also may be compressed or tightly laminated particulates or fabric materials, with or without bonding additives. Only as a point of interest, visual phonemes which are felt-based or felt-like are known commercially as FELT FONEMZ™.

Figure 3:
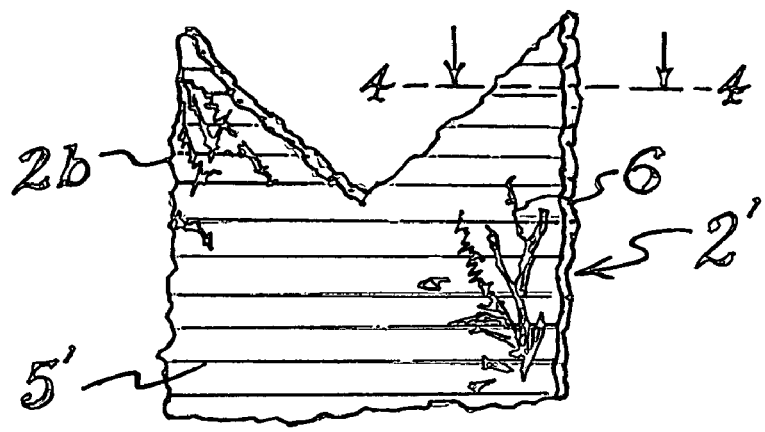
FIG. 3 shows a front perspective view of the fabrication of a single, visual phoneme that is optionally, substantially flexible, consistent with another embodiment of the present invention (This figure is noted as including material subject to Copyright)

In any case, the resultant flexible material article must be capable of maintaining (or recovering to) its assigned shape and of carrying a designated color required as a visual phoneme. Such flexible, soft fabrications are illustrated in FIG. 3 and result in a visual phoneme item that will have soft and flexible tactile characteristics. Clearly, this formulation may possess static-cling or similar affinity attributes that lend value in the teaching field (for example, where used in conjunction with felt boards or when placed on the students' clothing).

Optionally, a visual phoneme demonstrated in a teaching environment may be substantially rigid. Substantially rigid visual phonemes may be manufactured by various techniques employing substantially rigid material selected from the group consisting of wood, ceramic, metal, plastic, tag board, and cardboard materials. As examples, manufacturing or fabricating methods can include casting, molding, sintering, curing or vulcanizing. They also may include pressing and cutting of particulate materials as in tag board, cardboard, poster board, pulp board, cork board, resins and beads, pressed grass or seaweed, and other widely known compressible materials. Representational visual phonemes constructed from tag board, or similarly rigid or semi-rigid materials, are referred to commercially as FUN FONEMZ™ teaching tools. It should be noted that visual phonemes may be constructed from a combination of substantially soft fabrications and substantially rigid fabrications of the type and sources discussed above.

Visual phonemes in accordance with the present invention also may comprise magnetized plastic material (for example vinyl or other flexible plastic material incorporating a magnetizable powder). Any of the above visual phoneme constructs may include temporary fasteners affixed thereto, for example, VELCRO® hook and loop fasteners, spring clip, adhesive pad, safety pin, or a variety of other well known and equivalent fasteners.

When generated as electronic images displayed in specifically designated shapes, virtual textures and colors, data from which such electronic images are generated may be stored in a central server or remote data file unit, or on a discrete portable medium such as a laptop hard drive, floppy disc, compact disc, DVD, and/or similar electronic storage media as is well known in the art. For informational purposes only, applicant's electronically displayed FONEMZ™ are identified commercially as VIRTUAL FONEMZ™ and eFONEMZ™ teaching tools.

All variants of the representational visual phonemes (rigid, flexible, virtual, and rigid/flexible/virtual combinations) can be made available within, a convenient collection or kit from which the process and system are to be applied in an interactive learning environment. A kit or portable teaching system will be further explored below.

While the structural nature of a manufactured visual phoneme is important (particularly with respect to its rigidity, flexibility or malleability), further learning advantages reside in its specific shape, texture, and surface or composition color. Specific visual phoneme shapes are devised for unique application in the inventive method and system, in that they specifically correlate to principal spoken sounds commonly made in speaking a language, as for example the American English Language.

In other words, the designated shapes of the visual phoneme, displayed in two or three-dimension, correlate to the principal sounds of the language. Phoneme shapes described herein are essentially modeled after three distinct sources, and in every case are designated with an individually distinctive color.

FIGS. 1a–e illustrate the visual phoneme set 1 (see FIG. 1-a) of the present invention, displaying a unique shape for each phoneme within said set, along with its uniquely identifiable color. Colors noted are intended to be distinctive, and with special utility in certain groupings to be described. Shapes are chosen as individually distinguishing the visual phoneme in a manner also to be explained. However, the present invention is not to be limited to specific shapes and colors illustrated and described.

It is intended that spoken sounds in the form of vowels (see FIG. 1-b) and consonants (see FIG. 1-c, d, e) be represented by distinctive ranges of color hues, as for example by colors commonly characterized in the art as warm and cool. For example, warm colors include red, pink, orange, gold and yellow, and variants of each of these; cool colors include purple, blue, green, turquoise, gray, silver and white, and variants of each of these. Application of these colors can be of considerable value in the speech learning process.

Additionally, each phoneme shown in FIGS. 1a–e is labeled in such a way as to be correlated with the *International Phonetic Association Alphabet*, or IPA, (see IPA Prior Art as presented in FIG. 9). For example, in FIG. 1-c, visual phoneme 2 is designated as royal blue in color 3, and carries the IPA correlation, "[m]" as indicated by reference character 4.

Figure 2:
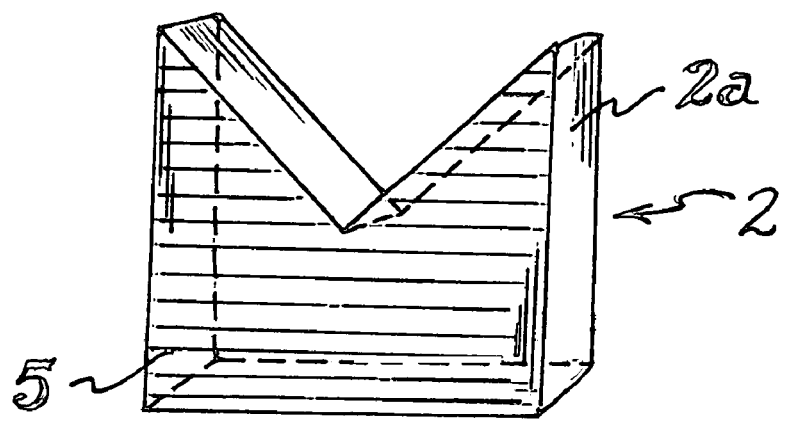
FIG. 2 illustrates a front perspective view of a single visual phoneme displayed in an optional, substantially rigid form in accordance with one embodiment of the present invention, and showing a typical three-dimensional shape (This figure is noted as including material subject to Copyright)

Visual phoneme 2 is again illustrated in FIG. 2, but in the form of a three dimensional element fabricated to a certain thickness and proportion suitable for physical demonstration or application. The physical thickness, scale and proportion illustrated is by way of example only, and in no way should be considered as limiting the scope of the present invention. The FIG. 2 embodiment of visual phoneme 2 is designated as "blue," so indicated by horizontal parallel lines on surface 5 thereof comporting to the *USPTO Guide for the Preparation of Patent Drawings*, October 1993. Visual phoneme 2 is shown in FIG. 2 as having a substantially rigid profile 2a.

With its substantially rigid construction, visual phoneme 2 enjoys the advantage of being capable of incorporating (in the fabrication thereof or attached thereto) magnetic characteristics for attachment to metal surfaces, as for example cabinets or refrigerator doors, as learning reminders. Alternatively, such substantially rigid elements may take form (not shown) similar to well-known building blocks or provided with other structural capabilities of special application to playful learning. The solid or substantially rigid form of visual phoneme shown in FIG. 2 also is considerably more durable and more easily cleaned.

Figure 4:
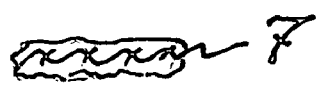
FIG. 4 is a cross-sectional view taken at section 4—4 on FIG. 3, showing the felt or felt-like fabrication of the embodiment of FIG. 3.

In FIG. 3, the representational visual phoneme 2' is illustrated as constructed of felt or felt-like material 6 presenting a substantially soft, flexible or malleable profile 2b. The fibrous nature of material 6 is more clearly illustrated at 7 in FIG. 4. This illustration also follows the noted *USPTO Guide* (supra), in that the color of surface 5' is depicted as blue by horizontal parallel lines. This embodiment is substantially soft to the touch and may have advantageous application where tactile interaction is important to the learning process. Further, the substantially soft visual phonemes may be purposefully crushed or crumbled, folded or temporarily reconfigured as in play. Additionally, felt or felt-like visual phonemes (or FELT FONEMZ™) have "clinging" tendencies and will attach or adhere to the fabric of most clothing or a compatible demonstration panel. This is a feature which can be motivational as well as useful as a playful demonstration tool.

Figure 5:
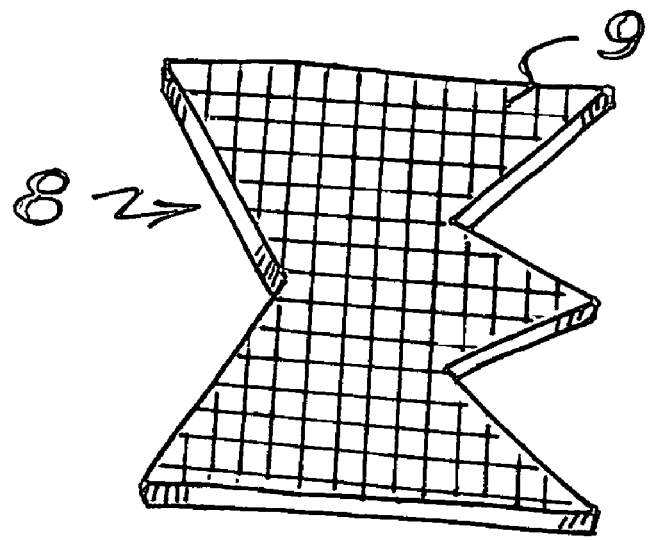
FIG. 5 illustrates a perspective view of another visual phoneme in accordance with the present invention process and system (This figure is noted as including material subject to Copyright)

The shape of a representative visual phoneme in accordance with this inventive system and process may also be reminiscent of the Roman alphabet with which it is most often associated. As an example, FIG. 5 illustrates the visual phoneme 8 having the long vowel sound made in sounding the letter E. This phoneme is uniquely designated by the color yellow, notably corresponding to FIG. 1. Again, following the *USPTO Guide*, supra, this color yellow is graphically depicted at 9 in FIG. 5 by parallel vertical lines intersecting with parallel horizontal lines.

Figure 6:
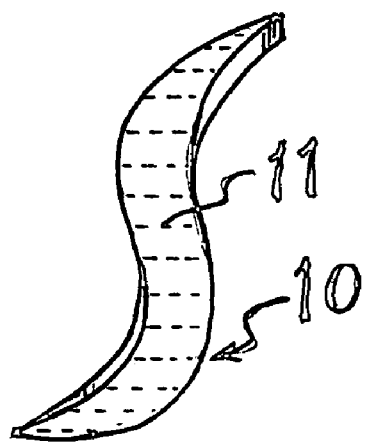
FIG. 6 illustrates a perspective view of yet another visual phoneme in accordance with the present invention process and system (This figure is noted as including material subject to Copyright)
Figure 7:
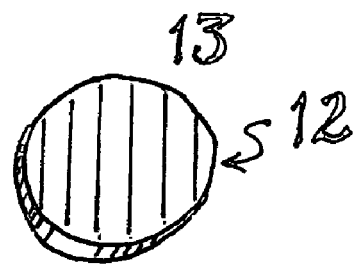
FIG. 7 illustrates a perspective view of still another visual phoneme in accordance with the present invention process and system (This figure is noted as including material subject to Copyright)

By design, some visual phonemes presented as aspects of this inventive process and system correspond to the representation by the *International Phonetic Alphabet*, or IPA, as exemplified in FIG. 6 as the phoneme 10. In this case, visual phoneme 10 has been uniquely assigned the color gray blue, and shown graphically as such by the application of parallel, horizontal dash-lines 11 (per *USPTO Guide*, supra). See also Other phonemes, in accordance with the preferred embodiment of the inventive process and system, reflect the shape of a speakers mouth naturally configured in generating certain sounds. FIG. 7 illustrates the phoneme 12, clearly the shape of the mouth of a person making the sound "O," as in "hot." In this case, phoneme 12 is graphically depicted as red by the vertical hatching lines 13.

This coloring system, listed in FIG. 1 and depicted in part in the subsequent figures, is in no way random. Vowels are assigned warm colors; consonants, cool colors. (Warm and cool color examples are provided above.) According to the present invention, a targeted spoken sound which would be the (diphthong) sound combination of a first and second vowel sound (as described above) is represented by a visual diphthong phoneme. The uniquely identifiable color of the diphthong visual phoneme would be a warm color (since it represents a vowel sound). Warm colors assigned to visual diphthong are blends (or combinations) of the unique colors of the first and second vowel sounds of the visual diphthong combination.

For example, following the chart in FIG. 1-b, the sound /o/ as made in "hot," is red. The sound /oo/ as in "boot" is off white. The sound /ow/ as made in "cow," presents a combination of /o/ and /oo/, and hence is depicted by the "blended" color pink.

Assigning colors in the manner consistent with the present invention is more than it would seem, particularly when associated with training tools. Studies have shown the influence of color on people; it impacts mood, emotion, memory and attention. According to Pantone Inc., of Carlstadt N.J., "Scientists have found that actual physiological changes take place in human beings when they are exposed to certain colors. Colors can stimulate, excite, depress, tranquilize, increase appetite and create a feeling of warmth or coolness. This is known as chromodynamics." Children's attention is especially drawn to color, according to Triedon and Cullen, *Color Graphics: the power of color in graphic design*, 2002. Colors depicted herein are by way of example. Other colors may be chosen to represent phonemes in a systematic manner without departing from the scope and spirit of the present invention.

FIG. 8 presents an illustrative embodiment of a kit generally designated as 14 containing sets of visual phonemes designated as 15 and 16, representing substantially rigid and substantially flexible phonemes, respectively. Of course, a kit or compartmentalized container can take any of a variety of forms. In this illustrative example, the illustrated kit defines portable storage space for teaching materials. An assemblage of phoneme collections and associated teaching aids are shown in an organized setting suitable for transport to the site of intended instruction, as for example, a classroom, pre-school location, the student's home, and the like.

The kit can include electronic storage media such as the CD's illustrated at 17. Further included, and appropriately stored in compartment 20 or other similar location for future reference and use, would be demonstrative images, for example the clown face drawing or photograph 18 displaying an "o" shaped mouth representing the sound /o/ as discussed above.

Any surface of the kit deemed suitable can be adapted as a supplemental display panel for holding or supporting phoneme representations during a teaching session. For example, the inner surface of lid 19 could be constructed, coated or otherwise configured so as to have a surface affinity, attraction or interlock with a corresponding surface of a phoneme, or with a surface of any of the associated teaching aids, as necessary. For instance, substantially rigid phonemes could be constructed of magnetic or magnetized material (in the way refrigerator magnets are commonly fabricated and employed), and a metal or metal-like panel could be employed as part or all of lid 19.

Alternatively, felt or felt-like phonemes, as discussed above, can be partnered with a fabric panel for which felt has an affinity. Such fabric might be suitably affixed to an inner surface, or actually forming the inner surface, of lid 19. Further, the partnered lid 19 and phoneme might be affixed through well known hook and loop fastener technology (e.g., VELCRO® fasteners); or, as a still further option, the elements could be affixed by application of a tacky substance.

In the exemplary illustration, phonemes designated 8 and 11, and discussed previously with respect to FIGS. 5 and 6, are shown displayed on lid 19, while phonemes 2a and 2b are shown partially nested in their respective storage locations.

Such kit may include other electronic media as for example DVD's or floppy discs, not shown. Lesson plans, protocols and instructor guides may be stored within said kit beneath said phoneme sets or elsewhere, as appropriate. In addition to the images partially displayed in compartment 20 The kit may further include demonstration panels or color plates, as for example, single panels depicting only colors. For example, a single panel may depict warm colors representing vowels. Cool colored panels may depict consonants.

An upscale, or high-tech version of a portable kit might include a built-in LCD screen display (not shown) essentially as part of an incorporated laptop personal computer (PC) or Apple®, as an example. The computer's hard drive, disc drive, or alternative drives or data source (even Internet-supplied data) may include digitized images of phonemes, examples of facial images demonstrating key lip configurations, and other educational aids as appropriate.

In use, such a kit or system may be transported to a school site or home where one or more students are assembled for instruction. A user of this kit or system may be a speech pathologist, a teacher, or in certain instances the students themselves, provided with ample directions for self instruction. Flexible or rigid visually tangible phonemes can be demonstrated in an interactive educational session.

For example, phonemes may be demonstrated selectively from a phoneme set or collection. These may be presented to a student (or subject, client and so forth) along with such other teaching aids as appropriate (for example, written words on a slate or whiteboard, demonstration articles and aids such as puppets, toys and the like, pictures of animals, celebrity images or cartoon characters). Thus, students observe the visual phoneme shapes and colors and learn to associate said visual phonemes with spoken sound to be replicated. The student benefits by being able to associate a sound to a precise physical representation of that same sound.

Additionally, or alternatively, a CD or DVD-based (or other electronic medium based) presentation can be offered employing a computer-generated picture, perhaps a morphed version of a popular young media personality (as duly authorized), where the mouth is configured as noted above to form associated sounds, along with changing background colors.

It is important to note that combinations of electronic and non-electronic media may be employed in carrying out the inventive process. Also, the entire experience may take place through a distance learning set-up involving remote sources accessed via the Internet or LAN resources.

In using the inventive process and system, instructors typically follow professional lesson plans to help the hearing-challenged students learn to speak. And they do so with their presentations enhanced and enriched through the imaginative and creative new tools afforded by the present invention.

There are no products on the market that associate each phoneme in the English language (or other language as may be appropriate) with a specific shape and color. Each of the phonemes presented herein is modeled after carefully selected a shape reflecting the IPA, mouth or lip configurations typical of certain sound formulations, certain English alphabet letters commonly associated with spoken sounds, and combinations of such.

Use of these phonemes can help illustrate the order of individual sounds within a word. Subsequent combined use of the Roman alphabet and these inventive phonemes can help a student subject to make the association needed to begin to read. For instance, the alphabet letter may be placed directly on the visual phoneme configuration.

The present invention provides still further benefits in that the inventive, visual phonemes, commercially known as FONEMZ™, offer tangible means and method steps of graphically presenting phonemes to the child or adult student. They eliminate confusion with Roman alphabet letter identification, an advantage especially important to the very young child usually unfamiliar with the Roman alphabet or an older student with memory issues. There is a one-to-one relationship between each inventive, visual phoneme, and phonemes common to the English language or any other language.

Visual phonemes represented by this invention can be manipulated and combined by instructors and other users to form syllables and words. The visual phonemes can be used in play. Additionally, users (students and teachers alike) can easily distinguish which sounds have been covered during a series of lessons.

Further, the inventive visual phonemes can be used to manipulate the order of sounds being presented; they can be readily employed to introduce right-to-left presentation for pre-reading skills. Advantageously, visual phonemes constructed or fabricated of felt, felt-like material or the like, known commercially as FELT FONEMZ™, are substantially flexible. They can be crumpled or wadded-up and recover their shape through material memory. This also introduces a new and helpful dimension to the learning process, and encourages playful, tactile involvement by the students.

For the children, still further advantages are offered by this invention. Students, for the first time can make clear associations between phoneme generation, the physical movements involved in sound production and a demonstrated, concrete shape. The use of different color and shape makes for clearer and more memorable associations. Colored shapes are interesting, highly motivational and easier to remember than black and white Roman alphabet letters.

Children can manipulate the inventive visual phonemes, or FONEMZ™, to become interactively involved in the educational process. Felt-constructed phonemes, or FELT FONEMZ™, as described above may be placed directly on or against the students' own clothing, or against that of the teacher (so as to cling thereto). This adds yet another dimension to the utility of these inventive phonemes.

For example, the clinging quality of a felt-like phonemes will temporarily affix the phoneme in place as a prompting designation of the person who is to be attempting a targeted sound production associated with said FELT FONEMZ™. This also can be a form of recognition or award designation, where felt-like phonemes are displayed (affixed) on the clothing of the student who has mastered them.

Any person involved in the teaching or learning of the production of speech sounds, phonemic awareness or even pre-reading skills can use and benefit from this invention. Again, for sake of clarity, the term "teacher" is intended to extend to speech pathologists, special education professionals, reading specialists, parents, and so on. Students benefiting from the invention of the visual phonemes or FONEMZ™ might be those with hearing impairments, learning disabilities, developmental delays, autism and any other condition associated with communicative disorders.

Upon careful reading of the foregoing specification and reviewing the drawings, it will be evident that this invention is susceptible of many modifications, combinations and alterations in a number of ways which may differ from those set forth. The particular arrangements disclosed are meant to be illustrative only and not limiting as to the scope of the invention which is to be given the full breadth of the claims appended hereto and any and all equivalents thereof.

What is claimed is:

1. A system for teaching speech to people with hearing or speech disabilities, said system including a set of visual phonemes formed to represent spoken sounds, said system further characterized by:
   each of said visual phonemes in said set is distinguished by having a unique shape representing an individual spoken sound;
   each of said visual phonemes in said set is further distinguished by having a uniquely identifiable color;
   some visual phonemes in said set are formed to represent individual spoken vowel sounds and some visual phonemes in said set are formed to represent individual spoken consonant sounds;
   the uniquely identifiable color of said visual phonemes formed to represent vowel sounds is a warm color;
   the uniquely identifiable color of said visual phonemes formed to represent consonant sounds is a cool color;
   some of said visual phonemes formed to represent individual spoken vowel sounds are visual diphthong phonemes each representing a dipthong sound combination of first and second spoken vowel sounds;
   the uniquely identifiable color of each of said diphthong visual phonemes is a warm color blend of each uniquely identifiable color of phonemes representing each of said first and second spoken vowel sounds of said diphthong sound combination;
whereby said visual phonemes from said set may be selectively demonstrated to said people with hearing or speech disabilities such that said people observe the visual phoneme shapes and colors and learns to associate said visual phonemes with spoken sounds to be replicated.

2. The system of claim 1 wherein some of said visual phonemes in said set have shapes comporting to shapes of phonemes selected from the International Phonetic Alphabet.

3. The system of claim 2 wherein some of said visual phonemes in said set have uniquely identifiable shapes simulating shapes of a speaker's mouth when forming specific speech sounds.

4. The system of claim 3 wherein some of said visual phonemes in said set have uniquely identifiable shapes simulating English alphabet letters associated with certain spoken sounds.

5. The system of claim 1 further characterized by:
   said visual phonemes are three dimensional in form and are fabricated of substantially flexible material;

said substantially flexible material is selected from the group consisting of felt, felt-like, foam, plastic, rubber, paper and cloth materials.

6. The system of claim 1 further characterized by:
said visual phonemes are three dimensional in form and are fabricated of substantially rigid material;
said substantially rigid material is selected from the group consisting of wood, ceramic, metal, plastic, tag board, and cardboard materials.

7. The system of claim 1 wherein said visual phonemes are in an electronic form within a computerized display, and adapted to be viewed on a display screen.

8. A kit for teaching speech to people with hearing or speech disabilities, said kit comprising:
a container including a set of visual phonemes formed to represent spoken sounds,
said set of visual phonemes contained within said container, and removable for display;
each of said visual phonemes in said set is distinguished by having a unique shape representing an individual spoken sound;
each of said visual phonemes in said set is further distinguished by having a uniquely identifiable color;
some of said visual phonemes in said set have shapes comporting to specific shapes of phonemes selected from the International Phonetic Alphabet;
some of said visual phonemes in said set have uniquely identifiable shapes simulating shapes of a speaker's mouth when forming specific speech sounds;
some of said visual phonemes in said set have uniquely identifiable shapes simulating English alphabet letters associated with certain spoken sounds;
some phonemes in said set are formed to represent individual spoken vowel sounds and some visual phonemes in said set are formed to represent individual consonant sounds;
the uniquely identifiable color of said visual phonemes formed to represent vowel sounds is a warm color;
the uniquely identifiable color of said visual phonemes formed to represent consonant sounds is a cool color;
some of said visual phonemes in said kit formed to represent individual spoken vowel sounds are visual diphthong phonemes each representing a diphthong sound combination of first and second vowel sounds;
the uniquely identifiable color of each of said diphthong visual phonemes is a warm color blend of each uniquely identifiable color of visual phonemes representing said first and second vowel sounds of said diphthong sound combination;
whereby visual phonemes included within said kit may be selectively demonstrated to said people with hearing or speech disabilities such that said people observe the visual phoneme shapes and colors and learn to associate said visual phonemes with spoken sounds to be replicated.

9. Said kit of claim 8 further including:
a display surface adapted for holding said visual phonemes during a teaching session;
storage space within said container for holding teaching materials.

10. A process for teaching speech to people with hearing or speech disabilities, said process including the steps of:
identifying spoken sounds to be taught to said people;
providing a set of visual phonemes uniquely representing each of said spoken sounds wherein said visual phonemes are formed by
providing each of said visual phonemes with a uniquely identifiable shapes to uniquely represent said spoken sounds, some of which shapes include the shapes of phonemes selected from the International Phonetic Alphabet;
further providing each of said visible phonemes in said set a uniquely identifiable color;
providing some visual phonemes to represent vowel sounds and some visual phonemes to represent consonant sounds;
further providing each of said visual phonemes corresponding to vowel sounds with a uniquely identifiable warm color;
further providing each of said visual phonemes corresponding to consonant sounds with a uniquely identifiable cool color;
providing visual diphthong phonemes each representing a diphthong sound combination of first and second spoken vowel sounds;
further providing each of said visual diphthong Phonemes with a warm color blend of each uniquely identifiable warm color of phonemes representing each of said first and second spoken vowel sounds of said diphthong sound combinations;
selectively presenting one or more of said visual phonemes to said people;
thus enabling said people to recognize said visual phonemes by their uniquely identifiable shapes and colors, and to associate said visible phonemes with spoken sounds to be replicated.

11. The process of claim 10 including the further steps of:
providing some of said visual phonemes with uniquely identifiable shapes simulating shapes of a speaker's mouth when forming specific speech sounds.

12. The process defined in claim 11, including the further steps of:
further forming some of said visual phonemes into uniquely identifiable shapes corresponding to the shapes of Roman alphabet letters associated with certain spoken sounds.

13. The process of claim 10 including the step of forming at least some of said visual phonemes as three-dimensional visual phoneme fabrications;
presenting said three-dimensional visual phoneme fabrications to said people with hearing or speech disabilities in an interactive educational session.

14. The process of claim 10 further including the step of:
digitally storing images of at least some of said visual phonemes in electronic form;
selectively displaying to said people one or more digitally stored visual phonemes on a computerized display screen in an interactive educational session.

* * * * *